(12) United States Patent
Chai et al.

(10) Patent No.: US 8,949,871 B2
(45) Date of Patent: Feb. 3, 2015

(54) SMART MEDIA SELECTION BASED ON VIEWER USER PRESENCE

(75) Inventors: Crx K. Chai, Oakland, CA (US); Alex Fishman, San Francisco, CA (US)

(73) Assignee: OpenTV, Inc., San Francisco, CA (US)

(*) Notice: Subject to any disclaimer, the term of this patent is extended or adjusted under 35 U.S.C. 154(b) by 522 days.

(21) Appl. No.: 12/877,875

(22) Filed: Sep. 8, 2010

(65) Prior Publication Data

US 2012/0060176 A1    Mar. 8, 2012

(51) Int. Cl.
| | | |
|---|---|---|
| *H04N 7/16* | (2011.01) | |
| *H04H 60/33* | (2008.01) | |
| *H04H 60/45* | (2008.01) | |
| *H04H 60/65* | (2008.01) | |
| *H04H 60/46* | (2008.01) | |

(52) U.S. Cl.
CPC .............. *H04H 60/45* (2013.01); *H04H 60/65* (2013.01); *H04H 60/46* (2013.01)
USPC ................................. 725/10; 725/11; 725/12

(58) Field of Classification Search
CPC .................. H04N 21/25891; H04N 21/44218; H04N 21/4661; H04N 21/4668
USPC ...................................................... 725/10–12
See application file for complete search history.

(56) References Cited

U.S. PATENT DOCUMENTS

| | | |
|---|---|---|
| 4,718,107 A | 1/1988 | Hayes et al. |
| 4,769,697 A | 9/1988 | Gilley et al. |
| 4,907,079 A | 3/1990 | Turner et al. |
| 4,930,160 A | 5/1990 | Vogel |
| 4,931,865 A | 6/1990 | Scarampi |
| 5,019,899 A | 5/1991 | Boles et al. |
| 5,034,807 A | 7/1991 | Von Kohom |
| 5,068,733 A | 11/1991 | Bennett |
| 5,099,322 A | 3/1992 | Gove |
| 5,227,874 A | 7/1993 | Von Kohorn |
| 5,264,933 A | 11/1993 | Rosser et al. |
| 5,283,639 A | 2/1994 | Esch et al. |
| 5,353,392 A | 10/1994 | Luquet et al. |
| 5,373,315 A | 12/1994 | Dufresne et al. |

(Continued)

FOREIGN PATENT DOCUMENTS

| | | |
|---|---|---|
| EP | 0921696 A1 | 6/1999 |
| EP | 0967804 A2 | 12/1999 |

(Continued)

OTHER PUBLICATIONS

"About TVML", Product Documentation, [Online]. Retrieved from the Internet: <URL: http://web.archive.org/web/19961214195058/http://www.tvml.co.uk/developer/about.htm>, (1996), 2 pgs.

(Continued)

*Primary Examiner* — Gigi L Dubasky
(74) *Attorney, Agent, or Firm* — Schwegman Lundberg & Woessner, P.A.

(57) ABSTRACT

In various exemplary embodiments, a system and method to provide smart media selection to a set of one or more individuals at a location associated with a display device of a receiver system is provided. In example embodiments, an indication of a presence change at the location is received. User specific information associated with the set of the one or more individuals identified as being at the location is accessed. A recommendation playlist based on the user specific information is generated.

17 Claims, 8 Drawing Sheets

(56) References Cited

U.S. PATENT DOCUMENTS

| | | |
|---|---|---|
| 5,382,983 A | 1/1995 | Kwoh et al. |
| 5,410,326 A | 4/1995 | Goldstein |
| 5,467,288 A | 11/1995 | Fasciano et al. |
| 5,483,276 A | 1/1996 | Brooks et al. |
| 5,497,185 A | 3/1996 | Dufresne et al. |
| 5,508,731 A | 4/1996 | Kohorn |
| 5,515,485 A | 5/1996 | Luquet et al. |
| 5,524,193 A | 6/1996 | Covington et al. |
| 5,543,856 A | 8/1996 | Rosser et al. |
| 5,546,471 A | 8/1996 | Merjanian |
| 5,579,002 A | 11/1996 | Igguiden et al. |
| 5,583,980 A | 12/1996 | Anderson |
| 5,590,262 A | 12/1996 | Isadore-Barreca |
| 5,600,368 A | 2/1997 | Matthews, III |
| 5,600,775 A | 2/1997 | King et al. |
| 5,603,078 A | 2/1997 | Henderson et al. |
| 5,604,896 A | 2/1997 | Duxbury et al. |
| 5,613,909 A | 3/1997 | Stelovsky |
| 5,614,940 A | 3/1997 | Cobbley et al. |
| 5,621,454 A | 4/1997 | Ellis et al. |
| 5,627,936 A | 5/1997 | Prasad et al. |
| 5,631,903 A | 5/1997 | Dianda et al. |
| 5,635,989 A | 6/1997 | Rothmuller |
| 5,652,615 A | 7/1997 | Bryant et al. |
| 5,655,144 A | 8/1997 | Milne et al. |
| 5,661,516 A | 8/1997 | Carles |
| 5,663,756 A | 9/1997 | Blahut et al. |
| 5,664,046 A | 9/1997 | Abecassis |
| 5,675,511 A | 10/1997 | Prasad et al. |
| 5,680,639 A | 10/1997 | Milne et al. |
| 5,708,845 A | 1/1998 | Wistendahl et al. |
| 5,715,014 A | 2/1998 | Perkins et al. |
| 5,724,472 A | 3/1998 | Abecassis |
| 5,727,141 A | 3/1998 | Hoddie et al. |
| 5,740,549 A | 4/1998 | Reilly et al. |
| 5,758,257 A | 5/1998 | Herz et al. |
| 5,758,259 A | 5/1998 | Lawler |
| 5,765,164 A | 6/1998 | Prasad et al. |
| 5,771,307 A | 6/1998 | Lu et al. |
| 5,774,664 A | 6/1998 | Hidary et al. |
| 5,774,666 A | 6/1998 | Portuesi |
| 5,793,409 A | 8/1998 | Tetsumura |
| 5,794,210 A | 8/1998 | Goldhaber et al. |
| 5,798,785 A | 8/1998 | Hendricks et al. |
| 5,801,747 A | 9/1998 | Bedard |
| 5,818,510 A | 10/1998 | Cobbley et al. |
| 5,828,402 A | 10/1998 | Collings |
| 5,854,927 A | 12/1998 | Gelissen |
| 5,859,662 A | 1/1999 | Cragun et al. |
| 5,861,881 A | 1/1999 | Freeman et al. |
| 5,894,320 A | 4/1999 | Vancelette |
| 5,898,838 A | 4/1999 | Wagner |
| 5,917,830 A | 6/1999 | Chen et al. |
| 5,920,642 A | 7/1999 | Merjanian |
| 5,929,849 A | 7/1999 | Kikinis |
| 5,929,850 A | 7/1999 | Broadwin et al. |
| 5,931,908 A | 8/1999 | Gerba et al. |
| 5,945,988 A | 8/1999 | Williams et al. |
| 5,951,639 A | 9/1999 | MacInnis |
| 5,970,504 A | 10/1999 | Abe et al. |
| 5,973,683 A | 10/1999 | Cragun et al. |
| 5,977,962 A | 11/1999 | Chapman et al. |
| 5,978,013 A | 11/1999 | Jones et al. |
| 5,982,399 A | 11/1999 | Scully et al. |
| 5,987,509 A | 11/1999 | Portuesi |
| 5,990,911 A | 11/1999 | Arrott |
| 5,995,091 A | 11/1999 | Near et al. |
| 6,002,393 A | 12/1999 | Hite et al. |
| 6,002,443 A | 12/1999 | Iggulden |
| 6,006,241 A | 12/1999 | Purnaveja et al. |
| 6,006,256 A | 12/1999 | Zdepski et al. |
| 6,012,098 A | 1/2000 | Bayeh et al. |
| 6,020,882 A | 2/2000 | Kinghorn et al. |
| 6,021,275 A | 2/2000 | Horwat |
| 6,028,950 A | 2/2000 | Merjanian |
| 6,029,045 A | 2/2000 | Picco et al. |
| 6,038,367 A | 3/2000 | Abecassis |
| 6,049,821 A | 4/2000 | Theriault et al. |
| 6,057,833 A | 5/2000 | Heidmann et al. |
| 6,057,872 A | 5/2000 | Candelore |
| 6,058,430 A | 5/2000 | Kaplan |
| 6,061,056 A | 5/2000 | Menard et al. |
| 6,061,719 A | 5/2000 | Bendinelli et al. |
| 6,069,672 A | 5/2000 | Claassen |
| 6,075,526 A | 6/2000 | Rothmuller |
| 6,075,971 A | 6/2000 | Williams et al. |
| 6,078,322 A | 6/2000 | Simonoff et al. |
| 6,083,276 A | 7/2000 | Davidson et al. |
| 6,091,886 A | 7/2000 | Abecassis |
| 6,100,916 A | 8/2000 | August et al. |
| 6,104,334 A | 8/2000 | Allport |
| 6,104,423 A | 8/2000 | Elam |
| 6,124,877 A | 9/2000 | Schmidt |
| 6,125,259 A | 9/2000 | Perlman |
| 6,128,011 A | 10/2000 | Peng |
| 6,134,243 A | 10/2000 | Jones et al. |
| 6,144,401 A | 11/2000 | Casement et al. |
| 6,151,444 A | 11/2000 | Abecassis |
| 6,154,205 A | 11/2000 | Carroll et al. |
| 6,154,771 A | 11/2000 | Rangan et al. |
| 6,163,272 A | 12/2000 | Goode |
| 6,166,780 A | 12/2000 | Bray |
| 6,173,317 B1 | 1/2001 | Chaddha et al. |
| 6,173,437 B1 | 1/2001 | Polcyn |
| 6,175,718 B1 | 1/2001 | Kim et al. |
| 6,175,840 B1 | 1/2001 | Chen et al. |
| 6,177,931 B1 | 1/2001 | Alexander et al. |
| 6,178,446 B1 | 1/2001 | Gerszberg et al. |
| 6,195,090 B1 | 2/2001 | Riggins, III |
| 6,201,538 B1 | 3/2001 | Wugofski |
| 6,216,263 B1 | 4/2001 | Elam |
| 6,226,793 B1 | 5/2001 | Kwoh |
| 6,229,524 B1 | 5/2001 | Chemock et al. |
| 6,229,546 B1 | 5/2001 | Lancaster et al. |
| 6,230,172 B1 | 5/2001 | Purnaveja et al. |
| 6,240,555 B1 | 5/2001 | Shoff et al. |
| 6,256,785 B1 | 7/2001 | Klappert et al. |
| 6,263,189 B1 | 7/2001 | Reagor |
| 6,263,332 B1 | 7/2001 | Nasr et al. |
| 6,263,500 B1 | 7/2001 | Yoshida et al. |
| 6,266,793 B1 | 7/2001 | Mozdzen et al. |
| 6,269,216 B1 | 7/2001 | Abecassis |
| 6,292,805 B1 | 9/2001 | Basso et al. |
| 6,297,853 B1 | 10/2001 | Sharir et al. |
| 6,308,327 B1 | 10/2001 | Liu et al. |
| 6,314,568 B1 | 11/2001 | Ochiai et al. |
| 6,317,881 B1 | 11/2001 | Shah-Nazaroff et al. |
| 6,324,519 B1 | 11/2001 | Eldering |
| 6,330,719 B1 | 12/2001 | Zigmond et al. |
| 6,345,278 B1 | 2/2002 | Hitchcock et al. |
| 6,349,410 B1 | 2/2002 | Lortz |
| 6,356,933 B2 | 3/2002 | Mitchell et al. |
| 6,357,042 B2 | 3/2002 | Srinivasan et al. |
| 6,359,661 B1 | 3/2002 | Nickum |
| 6,363,380 B1 | 3/2002 | Dimitrova |
| 6,377,995 B2 | 4/2002 | Agraharam et al. |
| 6,404,445 B1 | 6/2002 | Galea et al. |
| 6,415,438 B1 | 7/2002 | Blackketter et al. |
| 6,426,778 B1 | 7/2002 | Valdez, Jr. |
| 6,438,752 B1 | 8/2002 | McClard |
| 6,446,246 B1 | 9/2002 | Suto |
| 6,446,261 B1 | 9/2002 | Rosser |
| 6,449,766 B1 | 9/2002 | Fleming |
| 6,449,767 B1 | 9/2002 | Krapf et al. |
| 6,463,585 B1 | 10/2002 | Hendricks et al. |
| 6,476,828 B1 | 11/2002 | Burkett et al. |
| 6,476,833 B1 | 11/2002 | Moshfeghi |
| 6,477,579 B1 | 11/2002 | Kunkel et al. |
| 6,481,011 B1 | 11/2002 | Lemmons |
| 6,483,547 B1 | 11/2002 | Eyer |
| 6,493,872 B1 | 12/2002 | Rangan et al. |
| 6,513,160 B2 | 1/2003 | Dureau |
| 6,519,770 B2 | 2/2003 | Ford |
| 6,551,357 B1 | 4/2003 | Madduri |

(56) References Cited

U.S. PATENT DOCUMENTS

| | | |
|---|---|---|
| 6,560,366 B1 | 5/2003 | Wilkins |
| 6,560,777 B2 | 5/2003 | Blackketter et al. |
| 6,581,207 B1 | 6/2003 | Sumita et al. |
| 6,594,825 B1 | 7/2003 | Goldschmidt Iki |
| 6,615,408 B1 | 9/2003 | Kaiser et al. |
| 6,675,384 B1 | 1/2004 | Block et al. |
| 6,675,388 B1 | 1/2004 | Beckmann et al. |
| 6,698,020 B1 | 2/2004 | Zigmond et al. |
| 6,721,954 B1 | 4/2004 | Nickum |
| 6,725,421 B1 | 4/2004 | Boucher et al. |
| 6,760,043 B2 | 7/2004 | Markel |
| 6,766,524 B1 | 7/2004 | Matheny et al. |
| 6,785,902 B1 | 8/2004 | Zigmond et al. |
| 6,791,579 B2 | 9/2004 | Markel |
| 6,826,597 B1 | 11/2004 | Lonnroth et al. |
| 6,880,171 B1 | 4/2005 | Ahmad et al. |
| 6,938,270 B2 | 8/2005 | Blackketter et al. |
| 6,941,521 B2 | 9/2005 | Lin et al. |
| 2001/0011375 A1 | 8/2001 | Yun et al. |
| 2001/0023436 A1 | 9/2001 | Srinivasan et al. |
| 2001/0037500 A1 | 11/2001 | Reynolds et al. |
| 2002/0010923 A1 | 1/2002 | Pack et al. |
| 2002/0023263 A1 | 2/2002 | Ahn et al. |
| 2002/0029256 A1 | 3/2002 | Zintel et al. |
| 2002/0035728 A1 | 3/2002 | Fries |
| 2002/0049983 A1 | 4/2002 | Bove, Jr. et al. |
| 2002/0049984 A1 | 4/2002 | Klappert et al. |
| 2002/0056090 A1 | 5/2002 | Wagner et al. |
| 2002/0056136 A1 | 5/2002 | Wistendahl et al. |
| 2002/0057286 A1 | 5/2002 | Markel |
| 2002/0057837 A1 | 5/2002 | Wilkinson et al. |
| 2002/0059117 A1 | 5/2002 | Yoch et al. |
| 2002/0059588 A1 | 5/2002 | Huber et al. |
| 2002/0059590 A1 | 5/2002 | Kitsukawa et al. |
| 2002/0059629 A1 | 5/2002 | Markel |
| 2002/0065678 A1 | 5/2002 | Peliotis et al. |
| 2002/0069405 A1 | 6/2002 | Chapin et al. |
| 2002/0073416 A1 | 6/2002 | Ramsey Catan |
| 2002/0088008 A1 | 7/2002 | Markel |
| 2002/0088011 A1 | 7/2002 | Lamkin et al. |
| 2002/0089542 A1 | 7/2002 | Imamura |
| 2002/0095687 A1 | 7/2002 | Shintani et al. |
| 2002/0112249 A1 | 8/2002 | Hendricks et al. |
| 2002/0120931 A1 | 8/2002 | Huber et al. |
| 2002/0126990 A1 | 9/2002 | Rasmussen et al. |
| 2002/0129364 A1 | 9/2002 | Smith et al. |
| 2002/0131511 A1 | 9/2002 | Zenoni |
| 2002/0133817 A1 | 9/2002 | Markel |
| 2002/0147987 A1 | 10/2002 | Reynolds et al. |
| 2002/0162117 A1 | 10/2002 | Pearson et al. |
| 2002/0162121 A1 | 10/2002 | Mitchell |
| 2002/0174425 A1 | 11/2002 | Markel et al. |
| 2003/0028873 A1 | 2/2003 | Lemmons |
| 2003/0037334 A1 | 2/2003 | Khoo et al. |
| 2003/0093790 A1 | 5/2003 | Logan et al. |
| 2003/0149983 A1 | 8/2003 | Markel |
| 2003/0177199 A1 | 9/2003 | Zenoni |
| 2003/0196164 A1 | 10/2003 | Gupta et al. |
| 2003/0217365 A1 | 11/2003 | Caputo |
| 2003/0237093 A1* | 12/2003 | Marsh ............... 725/46 |
| 2004/0021679 A1 | 2/2004 | Chapman et al. |
| 2004/0031062 A1 | 2/2004 | Lemmons |
| 2004/0073953 A1 | 4/2004 | Xu et al. |
| 2004/0163045 A1 | 8/2004 | Hui et al. |
| 2004/0210947 A1 | 10/2004 | Shusman |
| 2004/0237108 A1 | 11/2004 | Drazin et al. |
| 2005/0028194 A1 | 2/2005 | Elenbaas et al. |
| 2005/0160458 A1 | 7/2005 | Baumgartner |
| 2006/0123448 A1 | 6/2006 | Ma et al. |
| 2007/0033607 A1* | 2/2007 | Bryan ............... 725/10 |
| 2007/0041705 A1* | 2/2007 | Bontempi ............... 386/83 |
| 2007/0136753 A1 | 6/2007 | Bovenschulte et al. |
| 2007/0157242 A1* | 7/2007 | Cordray et al. ............... 725/46 |
| 2007/0157248 A1 | 7/2007 | Ellis |
| 2008/0163059 A1 | 7/2008 | Craner |
| 2009/0052859 A1 | 2/2009 | Greenberger et al. |
| 2009/0100469 A1 | 4/2009 | Conradt et al. |
| 2009/0164450 A1 | 6/2009 | Martinez et al. |
| 2011/0060649 A1 | 3/2011 | Dunk et al. |
| 2011/0145040 A1* | 6/2011 | Zahn et al. ............... 705/7.33 |
| 2012/0059825 A1 | 3/2012 | Fishman et al. |
| 2012/0060195 A1 | 3/2012 | Fishman et al. |

FOREIGN PATENT DOCUMENTS

| | | |
|---|---|---|
| EP | 0982943 A2 | 3/2000 |
| EP | 1021036 A2 | 7/2000 |
| EP | 0967804 A3 | 11/2000 |
| EP | 1056273 A2 | 11/2000 |
| EP | 1071287 A2 | 1/2001 |
| EP | 1056273 A3 | 1/2002 |
| FR | 2730837 A1 | 2/1995 |
| GB | 2327837 A | 2/1999 |
| JP | 10042271 A | 2/1998 |
| JP | 2000227851 A | 8/2000 |
| JP | 2003308145 A | 10/2003 |
| WO | WO-9115921 A1 | 10/1991 |
| WO | WO-9510919 A1 | 4/1995 |
| WO | WO-9625821 A1 | 8/1996 |
| WO | WO-9633572 A1 | 10/1996 |
| WO | WO-9637075 A1 | 11/1996 |
| WO | WO-9749236 A1 | 12/1997 |
| WO | WO-9749239 A1 | 12/1997 |
| WO | WO-9831114 A1 | 7/1998 |
| WO | WO-9915968 A1 | 4/1999 |
| WO | WO-9931881 A1 | 6/1999 |
| WO | WO-9935832 A1 | 7/1999 |
| WO | WO-0005884 A1 | 2/2000 |
| WO | WO-0038427 A1 | 6/2000 |
| WO | WO-0049520 A1 | 8/2000 |
| WO | WO-0049801 A1 | 8/2000 |
| WO | WO-0057295 A1 | 9/2000 |
| WO | WO-0128235 A1 | 4/2001 |
| WO | WO-0150752 A1 | 7/2001 |
| WO | WO-0199416 A2 | 12/2001 |
| WO | WO-0232136 A2 | 4/2002 |
| WO | WO-2012033489 A1 | 3/2012 |
| WO | WO-2012033921 A1 | 3/2012 |

OTHER PUBLICATIONS

"U.S. Appl. No. 09/941,148, Advisory Action mailed May 20, 2004", 3 pgs.

"U.S. Appl. No. 09/941,148, Amendment filed Apr. 26, 2004", 14 pgs.

"U.S. Appl. No. 09/941,148, Final Office Action mailed Apr. 25, 2007", 18 pgs.

"U.S. Appl. No. 09/941,148, Final Office Action mailed May 19, 2005", 10 pgs.

"U.S. Appl. No. 09/941,148, Final Office Action mailed Oct. 24, 2003", 11 pgs.

"U.S. Appl. No. 09/941,148, Non Final Office Action mailed Apr. 1, 2003", 8 pgs.

"U.S. Appl. No. 09/941,148, Non Final Office Action mailed Aug. 2, 2006", 16 pgs.

"U.S. Appl. No. 09/941,148, Non Final Office Action mailed Aug. 11, 2004", 13 pgs.

"U.S. Appl. No. 09/941,148, Non Final Office Action mailed Nov. 28, 2005", 19 pgs.

"U.S. Appl. No. 09/941,148, Preliminary Amendment filed Jun. 19, 2002", 1 pg.

"U.S. Appl. No. 09/941,148, Response filed Feb. 2, 2007 to Non Final Office Action mailed Aug. 2, 2006", 17 pgs.

"U.S. Appl. No. 09/941,148, Response filed Jul. 31, 2003 to Non Final Office Action mailed Apr. 1, 2003", 10 pgs.

"U.S. Appl. No. 09/941,148, Response filed Nov. 12, 2004 to Non Final Office Action mailed Aug. 11, 2004", 15 pgs.

"European Application Serial No. 01968190.7, European Amendment filed Aug. 18, 2011", 1 pg.

"European Application Serial No. 01968190.7, European Amendment filed Sep. 20, 2011", 3 pgs.

(56) References Cited

OTHER PUBLICATIONS

"European Application Serial No. 01968190.7, Office Action mailed May 17, 2010", 9 pgs.

"European Application Serial No. 01968190.7, Response filed Sep. 24, 2010 to Office Action mailed May 17, 2010", 5 pgs.

"HTML 4.0 Specification", W3C Recommendation, XP002191626, (Apr. 24, 1998), 12 pgs.

"HTML Support—Multimedia and Images", [Online] Retrieved from the Internet: <URL: http://www.citycat.ru/doc/HTML/IExplorer.30/mmedia.htm#Marquee>, (1996), 4 pgs.

"International Application Serial No. PCT/US01/26801, International Preliminary Examination Report mailed Nov. 25, 2003", 12 pgs.

"International Application Serial No. PCT/US01/26801, International Search Report mailed May 14, 2002", 3 pgs.

"International Application Serial No. PCT/US2011/50712, International Search Report mailed Jan. 5, 2012", 2 pgs.

"International Application Serial No. PCT/US2011/50712, Written Opinion mailed Jan. 5, 2012", 6 pgs.

"International Application Serial No. PCT/US2011/50839, International Search Report mailed Dec. 30, 2011", 2 pgs.

"International Application Serial No. PCT/US2011/50839, Written Opinion mailed Dec. 30, 2011", 4 pgs.

"MPEG-4 Authoring Tools Let Pros, Consumers Create Mutimedia for Web Pages, TV, HDTV", Sarnoff Document, XP002155140, (Dec. 10, 1998), 2 pgs.

Alvaer, Jose, "Realnetworks' Realaudio and Realvideo", Webdeveloper.com, guide to streaming multimedia, XP002150113, ISBN:0-471-24822-3, (1998), 20 pgs.

Chambers, C. S., "Designing a set-top box operating system", International conference on consumer electronics,IEEE US vol. CONF. 14, XP000547858 ISBN 0-7803-2141-3, (Jun. 7, 1995), 368-369.

Clearplay, "Being a Very Cool Responsible Parent Just Got a Whole Lot Easier", [Online]. Retrieved from the Internet: <URL: http://www.clearplay.com/>, (Accessed Jan. 13, 2003), 2 pages.

Clearplay, "Enjoy the Show!", Press Release, Dec. 10, 2001, "ClearPlay Launches Groundbreaking Movie Filtering,", [Online]. Retrieved from the Internet: <URL: http://www.clearplay.com/10Dec2001.asp>, (Dec. 10, 2001), 2 pages.

Cobb, Jerry, "Taking Violence out of DVD Movies—System from ClearPlay Removes 'R' Content from DVDs", CNBC, [Online]. Retrieved from the Internet: <URL: http://www.msnbc.com/news/857154.asp?cp1=1,>, (Jan. 9, 2003), 3 pgs.

EBU Project Group B/CA, "Functional model of a conditional access system", EBU Technical Review, 266, Grand-Saconnex, CH, (Winter 1995), 64-77.

Fernandez, Panadero MC, et al., "Mass-customizing electronic journals", Online!, XP002177409, (May 10, 1999), 11 pgs.

Giles, Aaron, "Transparency—A Quick and Dirty Utility for Creating Tranparent GIF Images", [Online]. Retrieved from the Internet: <URL:http://www.mit.edu:8001/people/nocturne/etc/Transparency_notes.html>, (Aug. 19, 1994), 2 pgs.

Levin, "Software Design of a Personal Television Service", ICCE 2000, (2000), pp. 26-27.

Shim, S.Y. Shim, et al., "Template Based Synchronized Multimedia Integration Language Authoring Tool", Proceedings of the SPIE, SPIE, Bellingham, VA, vol. 3964, (Jan. 2000), 134-142.

Vuorimaa, Petri, et al., "XML Based Text TV", IEEE—Wise '00 Proceedings of the First International Conference on Web, (2000), 109-113.

Watson, Christopher, "Scripting the Web (times 2)", [Online]. Retrieved from the Internet: <URL: http://groups.google.com/groups?q=javascript+hypermedia&hl=en&selm=cwatson-3008961022470001%40204.212.150.108&rnum=7>, (Aug. 30, 1996), 2 pages.

"U.S. Appl. No. 09/941,148, Amendment filed Sep. 19, 2005", 17 pgs.

"U.S. Appl. No. 09/941,148, Examiner Interview Summary mailed May 27, 2005", 2 pgs.

"U.S. Appl. No. 12/877,034, Non Final Office Action mailed Aug. 10, 2012", 11 pgs.

"U.S. Appl. No. 12/878,001, Non Final Office Action mailed Aug. 9, 2012", 11 pgs.

"European Application Serial No. 01968190.7, Office Action mailed Nov. 6, 2006", 4 pgs.

"European Application Serial No. 01968190.7, Response filed May 16, 2007 to Office Action mailed Nov. 6, 2006", 26 pgs.

"U.S. Appl. No. 12/877,034, Response filed Nov. 13, 2012 to Non Final Office Action mailed Aug. 10, 2012", 11 pgs.

"U.S. Appl. No. 12/878,001, Response filed Nov. 9, 2012 to Non Final Office Action mailed Aug. 9, 2012", 11 pgs.

"U.S. Appl. No. 12/877,034, Examiner Interview Summary mailed Jul. 24, 2013", 3 pgs.

"U.S. Appl. No. 12/877,034, Final Office Action mailed Mar. 25, 2013", 14 pgs.

"U.S. Appl. No. 12/878,001, Examiner Interview Summary mailed Jul. 24, 2013", 3 pgs.

"U.S. Appl. No. 12/878,001, Final Office Action mailed Mar. 29, 2013", 13 pgs.

"International Application Serial No. PCT/US2011/50712, International Preliminary Report on Patentability mailed Mar. 21, 2013", 8 pgs.

"International Application Serial No. PCT/US2011/50839, International Preliminary Report on Patentability mailed Mar. 21, 2013", 6 pgs.

Chai, Crx K., "U.S. Appl. No. 12/877,875 / Smart Media Selection Based on Viewer User Preference", 11.

"U.S. Appl. No. 12/877,034, Final Office Action mailed Jun. 13, 2014", 14 pgs.

"U.S. Appl. No. 12/877,034, Non Final Office Action mailed Oct. 1, 2013", 13 pgs.

"U.S. Appl. No. 12/877,034, Response filed Feb. 26, 2014 to Non Final Office Action mailed Oct. 1, 2013", 13 lpgs.

"U.S. Appl. No. 12/877,034, Response filed Aug. 26, 2013 to Final Office Action mailed Mar. 25, 2013", 12 pgs.

"U.S. Appl. No. 12/878,001, Final Office Action mailed Jul. 17, 2014", 12 pgs.

"U.S. Appl. No. 12/878,001, Non Final Office Action mailed Oct. 3, 2013", 12 pgs.

"U.S. Appl. No. 12/878,001, Response filed Apr. 1, 2014 to Non Final Office Action mailed Oct. 3, 2013", 13 pgs.

"U.S. Appl. No. 12/878,001, Response filed Aug. 23, 2013 to Final Office Action mailed Mar. 29, 2013", 12 pgs.

"Australian Application Serial No. 2011299234, Amendment filed Apr. 4, 2013", 11 pgs.

"Australian Serial No. 2011299221, First Examiner Report mailed May 2, 2014", 3 pgs.

\* cited by examiner

SMART MEDIA SELECTION BASED ON VIEWER USER PRESENCE

RELATED APPLICATION

The present application is related to U.S. patent application Ser. No. 12/878,001, filed Sep. 8, 2010 and entitled "Collecting Data from Different Sources," which is a continuation-in-part application of U.S. patent application Ser. No. 12/877,034, filed Sep. 7, 2010 and entitled "Smart Playlist," both disclosures of which are hereby incorporated by reference.

FIELD

The present application relates generally to the field of electronic communications and, in one example embodiment, to a system and method to provide smart media selection based on viewer user presence.

BACKGROUND

Television program distribution systems are available that provide live content and video-on-demand (VOD) to subscribers. These systems require a user to manually select a program that the user is interested in viewing on a presentation device. Any change in the media content viewed on the presentation device requires manually changing the program.

BRIEF DESCRIPTION OF THE DRAWINGS

Various ones of the appended drawings merely illustrate example embodiments and cannot be considered as limiting its scope.

DETAILED DESCRIPTION

Figure 1A:
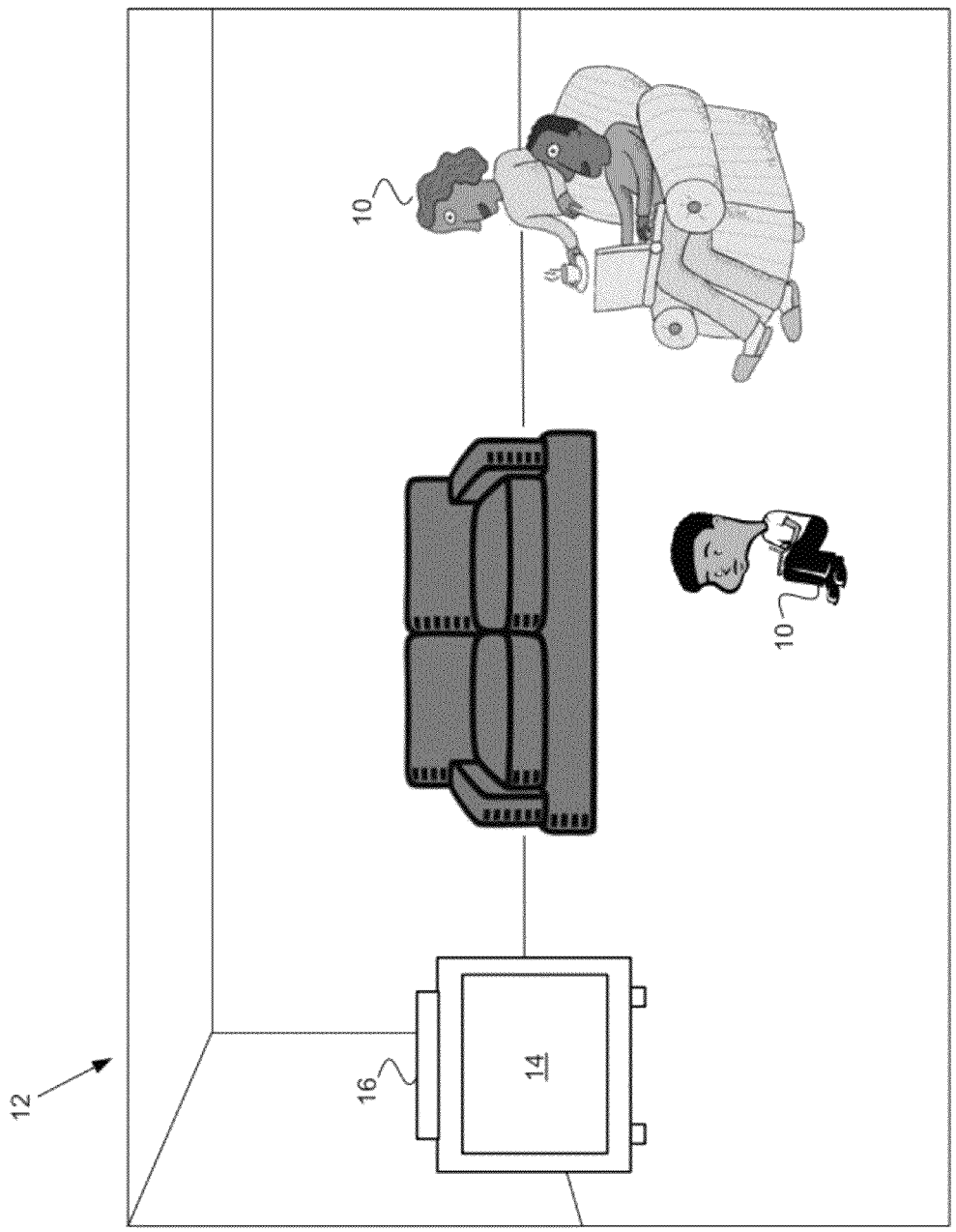
FIG. 1a shows an example viewing location with several viewers viewing content on a display device.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Although various example embodiments discussed below focus on a digital video distribution system, the embodiments are given merely for clarity in disclosure. Thus, any type of digital media distribution system (Internet, cable, satellite, or the like), including various system architectures, may employ various embodiments of the system and method described herein and be considered as being within a scope of example embodiments. Each of a variety of example embodiments is discussed in detail below.

Example embodiments described herein provide systems and methods to provide smart media selection based on viewer users presence. In various example embodiments, the smart media selection is provided based on a set of one or more individuals 10 at a viewing location 12 (e.g., family room in a home) associated with a display device 14 (e.g., television, computer monitor, etc.) of a receiver system 16 (e.g., set-top-box, media center, computer, etc.). In example embodiments, an indication of a change in presence at the viewing location 12 is received (e.g., at the set-top-box). The indication of the presence change may be triggered by a user entering the viewing location 12 or leaving the viewing location 12. When the user leaves the viewing location 12, the user is excluded or removed from a previous set of individual(s) 10 determined as present at the viewing location 12. For example, a dynamic set of users may be stored in memory in the set-top box that identifies one or more individuals present at the location (e.g., one or more users viewing television). If a user enters the viewing location 12, the user is included or added to the set of one or more individuals 10, or a new set is generated if the user is initiating a media viewing session (e.g., the first individual at the viewing location). The detection of a change in presence automatically triggers a change in content being displayed on the display device 14. For purposes of example embodiments, presence of the user at a viewing location is defined as presence of the user within an audible or visual distance to the display device 14 (or other device providing the media content) such that the user can consume (e.g., watch, hear) the media content.

In an example embodiment, user specific information (e.g., stored in memory in a set-top-box) associated with the set of the one or more individuals 10 identified as being at the viewing location 12 is accessed. The user specific information may comprise information from a user profile associated with each of the individuals 10. The user specific information may also, for example, comprise a group profile based on multiple individuals. The user profile information indicates media attributes (e.g., selected, preferred media content, excluded media content, or the like) regarding which the individual 10 has provided or assigned preferences. The user specific information may also comprise user history information. The user history information may comprise a list of previously consumed media content and one or more lists of preselected or stored media content. In an example embodiment, various different types of profiles may be defined and accessed to customize television viewing of one or more family members in a home. For example, one profile may relate to a father, another profile to a mother, another profile may relate to a child, and so on.

A recommendation playlist (e.g., recommended or authorized content) based on the user specific information may be generated. In an example embodiment, the recommendation playlist comprises a smart media selection or playlist that combines the media attributes of all the individuals identified as being present at the location. The recommendation playlist may also be based on the user histories resulting in inclusion or exclusion of specific media content. In an example embodiment, content not suitable for any one or more individual may be excluded.

Example embodiments allow a user to passively login in an automated fashion with a source system and be provided with recommendations that are tailored to the user's interest (or a group of user's interests). Accordingly, one or more of the methodologies discussed herein may obviate a need for the user to search for content that is suited to the user and any other individuals also present, which may have the technical effect of reducing computing resources used by one or more devices within the system. Examples of such computing resources include, without limitation, processor cycles, network traffic, memory usage, storage space, and power consumption. Further, example embodiments allow for automated exclusion or inclusion of content in an automated fashion. For example, when a child enters a living room and another viewer is watching content unsuitable for the child's consumption (e.g., a honor movie), the viewing device may automatically change the media content to something that is more appropriate for a child.

Figure 1B:
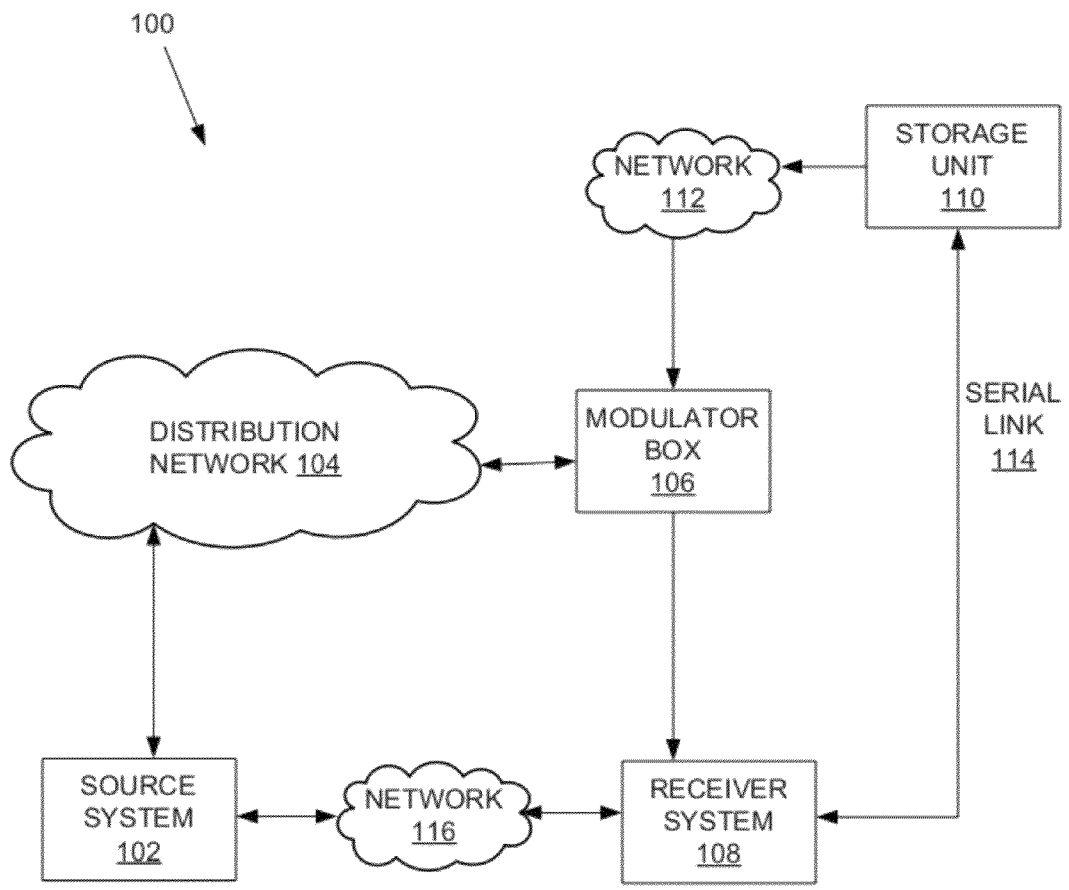
FIG. 1b is a block diagram illustrating an example embodiment of a network architecture of an example interactive media environment.

FIG. 1b illustrates a network architecture of an example interactive media environment 100 wherein example embodiments may be deployed. The interactive media environment 100 includes a source system 102 that communicates data (e.g., media data and interactive application data) via a distribution network or system 104 (e.g., the Internet, a mobile communication network, satellite network, cable network, or any other network capable of communicating or broadcasting digital data) and a modulator box 106 to a receiver system 108. In one example embodiment, the interactive media environment 100 optionally includes a storage unit 110 (e.g., personal computer) that communicates stored data via a network 112 (e.g., Ethernet) to the modulator box 106 which, in turn, communicates the stored data, media content data, and interactive application data to the receiver system 108. The modulator box 106, storage unit 110, and the receiver system 108 may be co-located in a user's home. Thus, in one embodiment, the modulator box 106 may combine media content data and interactive application data received from the remote source system 102 with locally stored data provided by the storage unit 110 within the user's home. The source system 102 is discussed in more detail in connection with FIG. 2, while the receiver system 108 is discussed in more detail in connection with FIG. 3a below.

Turning now to the example distribution system 104, the distribution system 104 may, in one example embodiment, support the broadcast distribution of data from the source system 102 to the receiver system 108. As shown, the distribution network or system 104 may comprise a satellite, cable, terrestrial or Digital Subscribers Line (DSL) network, Internet, or any other data communication network or combination of such networks.

The modulator box 106, in one example embodiment, receives stored data from the storage unit 110 and a broadcast transmission from the source system 102. The modulator box 106 multiplexes the stored data into the broadcast transmission thereby generating a second transmission that is communicated to the receiving system 108. It will, however, be appreciated that storage unit functionality is optional. The storage unit 110 may store data and, upon request, communicate the stored data to the modulator box 106 over the network 112 (e.g., Ethernet). The storage unit 110 may communicate the stored data in response to commands that are entered by a user from the receiving system 108 and communicated to the storage unit 110 over a link 114.

A network 116 may operate as a return channel whereby the receiver system 108 is provided with interactivity with the source system 102. Data provided to the source system 102 via the return channel may include user input to an interactive media application executed at the receiver system 108 or data that is generated by the receiver system 108 and communicated to the source system 102. For example, the data may include an indication of a presence change at a location of the receiver system 108 (e.g., a room whereby users are consuming media content) such as presence detection information or an identity of each individual at the location as will be discussed further below. The return channel may also provide a channel whereby programs, targeted advertisements or commercials, and applications from the source system 102 may be provided to the receiver system 108.

It will be appreciated to one skilled in the art that one or more of the modules, applications, or the like of the modulator box 106, the storage unit 110, and components of the receiving system 108 may be combined or integrated. In general, components, protocols, structures, and techniques not directly related to functions of example embodiments have not been shown or discussed in detail. The description given herein simply provides a variety of example embodiments to aid the reader in an understanding of the systems and methods used herein.

Figure 2:
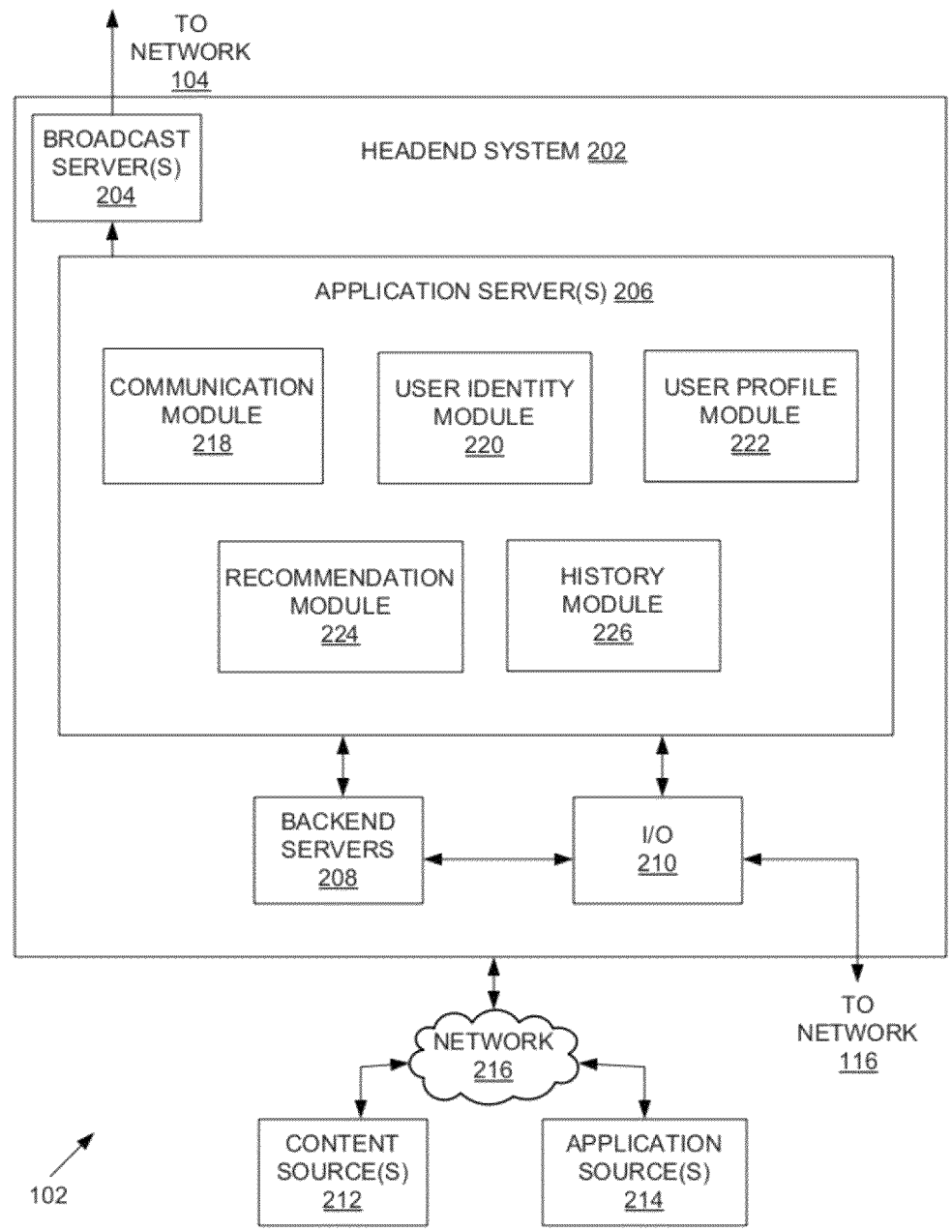
FIG. 2 is a block diagram illustrating an example embodiment of a source system of the network architecture of FIG. 1.

Referring now to FIG. 2, the source system 102 is shown according to one embodiment. The source system 102 comprises a headend system 202, which is an interactive media component that operates to communicate the data as, for example, a broadcast transmission. To this end, the headend system 202 is shown to comprise one or more broadcast servers 204 and one or more application servers 206. Each of the broadcast servers 204 may operate to receive, encode, packetize, multiplex, modulate, and broadcast data from various sources and of various types. While the example embodiment is described herein as transmitting data from the headend system 202 as a broadcast, it will be appreciated that the relevant data may also be unicast or multicast from the source system 102 via the distribution system 104 and modulator box 106 to the receiver system 108. In various embodiments, data could also be transmitted from the source system 102 via a network connection to the receiver system 108 (e.g., network 116). Further, in other example embodiments, the source system 102 may be modified to facilitate communications via the Internet, a mobile phone network, or any other network capable of communicating digital data.

The headend system 202 is also shown, by way of example, to include one or more backend servers 208, which are coupled to the application servers 206 and to an input/output (I/O) device 210 (e.g., a modem pool). Specifically, the I/O device 210 is coupled to receive data from the receiver system 108 via the network 116 (e.g., the Internet) and to provide this data to backend servers 208. The backend servers 208 may then provide the data, received from the receiver system 108, to the application servers 206 and the broadcast servers 204. Alternatively, data received from the receiver system 108 may be directly provided to the application servers 206.

The headend system 202 is also shown optionally to exchange data (e.g., content, code, and application data) with external sources. For example, the headend system 202 may be coupled to one or more content sources 212 and one or more application sources 214 via a network 216 (e.g., the Internet). For example, the content source 212 may be a provider of entertainment content (e.g., movie, songs), a provider of real-time dynamic data (e.g., weather information), a service provider (e.g., cable or satellite service provider), and the like. The application source 214 may be a provider of any interactive media application. For example, one or more application sources 214 may provide a TV media player application, electronic program guide and navigation applications, messaging and communication applications, information applications, widgets or interactive applications (e.g., smart phone application), and so forth. The application sources 214 may be configured to execute on different client devices (e.g., mobile phones, personal computer, STBs, smart phones, or the like). In some embodiments, the content sources 212 and the application sources 214 may be combined within the same component(s).

As such, in one embodiment, the headend system 202 may comprise a system that is source agnostic, which links to different companies (i.e., content sources 212 and application sources 214) to provide various forms of media content items to a recipient. That is, the source agnostic server may provide media content items from one type of content source 212 to a recipient associated with a different content source 212. For example, the recipient may subscribe to one particular cable television distributor, but may receive a media content item from a different television distributor.

Each application server 206, in one example embodiment, compiles and provides interactive data modules to the broadcast server 204. The interactive data modules may also include, for example, data that is utilized by an interactive television application. The application server 206 may also include multiplexing functionality to enable multiplexing of, for example, interactive television applications and associated data with audio and video signals received from various sources. The application server 206 may also have the capability to feed (e.g., stream) multiple interactive television applications to one or more broadcast servers 204 for distribution to the receiver system 108. To this end, each application server 206 may implement a so-called "carousel," whereby code and data modules are provided to a broadcast server 204 in a cyclic, repetitive manner for inclusion within a transmission from the headend system 202. In other embodiments, code may reside permanently in a component of the receiver system 108 (e.g., the code may be stored in non-volatile memory of a set-top box), may be pushed or downloaded to the component of the receiver system 108 or be provided to the component of the receiving system 108 in any other manner.

In one example embodiment, one or more of the application servers 206 operate to provide smart media selection based on view users preference at a location of the receiving system 108. As such, the application server(s) 206 may comprise one or more of a communication module 218, a user identity module 220, a user profile module 222, a recommendation module 224, and a history module 226 communicatively coupled together. For simplicity, components not directed to example embodiments are not included for the sake of clarity. In an alternative embodiment, one or more of the user identity module 220, the user profile module 222, the recommendation module 224 may be provided at the viewing location (e.g., in a set-top-box) as will be discussed in connection with FIG. 3b. Further, the functionality provided by one or more of the modules may be combined into a single module or several modules. The location of the various modules may, for example, be device specific. For example, the modules may be provided by a set-top-box in a fixed location viewing scenario (e.g., television in a family room). However, in a mobile environment where a mobile device is networked (e.g., in a cloud computing architecture) the modules may be provided remotely at a server. Further, in an example embodiment, the various modules may be distributed across a communication network.

The communications module 218 exchanges communications with various components of the headend system 202 and with devices coupled to the network 114 and 216. For example, the communication module 218 receives login information or presence information (e.g., indication of a change in presence) from the receiver system 108 (e.g., via the I/O device 210). The receipt of the presence information comprises an automatic detection, at the source system 102, of a change in presence at the receiver system 108. The communication module 218 then forwards the information to appropriate components of the application server 206 for processing or storage. Further, the communication module 218 returns smart media selections or recommendations (also known as a smart media playlist) based on the presence information.

The user identity module 220 determines an identity of a user at the receiver system 108. In some embodiments, the user identity module 220 receives the presence information (via the communication module 218) from the receiver system 108. The user identity module 220 then performs analysis on the presence information to identify the user triggering the presence change (e.g., user entering or leaving the location). In example embodiments, the presence information may be one or more of an image of the user (e.g., facial recognition), a fingerprint, a gesture of the user, or an audio recording of the user. In some cases, the presence information may be obtained from a radio-frequency identification (RFID) tag or other device identifier carried by the user (e.g., a cellular phone, a card).

In an example embodiment, the user identity module 220 takes the presence information and compares the presence information to corresponding stored data in a database coupled to the application server 206. For example, the user identity module 220 may take the RFID tag and attempt to match the RFID tag to tagging information stored in user profiles. Similar matching processes may be used with the various other forms of presence information. In some example embodiments, more than one form of presence information (e.g., facial recognition and gesture recognition) may be processed by the user identity module 220. This will allow for more accuracy in identifying the user. Additionally, more than one user may be identified based on presence information (e.g., when there are two users in a room).

As mentioned above, in an example embodiment, the determination of the identity may occur at the receiver system, as will be discussed in more detail below. In these alternative embodiments, the identity of the users (e.g., indication of presence change) are received by the communication module 218 and used to login the user and access the user profile as discussed below.

The user profile module 222 manages logins with the headend system 202 and accesses user profile information. In some embodiments, the user profile module 222 receives manual login information from the user at the receiver system 108 (via the communication module 218). In other example embodiments, the presence information may be used to passively login or logout one or more users whose presence is detected. In these embodiments, the user profile module 222 receives the user identity information determined by the user identity module 220 to login or logout the user with the headend system 202. It should be noted that user profile module may in addition or instead be located at the receiver system 108 (e.g., it may be provided in a set-top-box, computer, media center, or the like).

Once logged in, or otherwise identified by the application server 206, profile information for the user is accessed by the user profile module 222. The profile information comprises user preferences for various attributes associated with available media content (e.g., genre, rating type, actors, language, etc.). For example, a user profile established for a child (e.g., by a parent) may indicate that the child is allowed to view children's programming with a rating of "G." In another example, a user profile may indicate that the user prefers to watch romantic comedies and action films, but does not like to watch sporting events.

Taking the user profile information of the identified one or more users present at the location, the recommendation module 224 generates a smart media playlist (or media recommendation). The smart media playlist may comprise one or more media content selections which the recommendation module 224 determines may be of interest to the user(s) that are present at the location. In cases where more than one user (or viewer) is present, the recommendation module 224 may take the user profile information and perform an analysis to determine a smart media playlist that incorporates the preferences and requirements of each user profile. For example, a user1 may have a preference for viewing sporting events and action films while a user2 may have a preference to not watch violent movies. The recommendation module 224 may determine media content selections that are either directed to sporting events or action films that are not rated "R" for violence. In an example embodiment, various different rules for selecting or recommending media content are provided that process user profile information.

In some example embodiments, each of the users identified as being present may have a preselected list of media content associated with their account. For example, each user may have a list of media content recorded for later viewing (e.g., DVR) or a list of media content queued up for viewing (e.g., from NetFlix). The recommendation module 224 may access these lists and attempt to find matches between these lists of the users that are present at the location. In an example embodiment, the recommendation module 224 may in addition or instead be provided at the receiver system 108.

The recommendation module 224 may also take into consideration media content that is currently being broadcast (e.g., from a network broadcaster). In these example embodiments, the recommendation module 224 accesses a media content guide of currently broadcasting media content and performs the selection processing against the media content guide to determine a smart media playlist.

The recommendation module 224 may also work in connection with the history module 226 to remove media content selections that may already have been consumed (e.g., viewed) by one of the users. The history module 226 may also maintain a list of media content that the user has stored for later viewing. As such, the history module 226 maintains information regarding previously consumed and stored media content. In an example embodiment the history module 226 may in addition or instead be provided at the receiver system 108.

Additionally, the recommendation module 224 may utilize information from other users of the receiver system 102. For example, recommendations from friends or based on selections by these friends of the users present at the location may be incorporated into the analysis. This allows a social aspect to be factored into the recommendation to the user.

In one example scenario, if the user is watching a violent or "R" rated media content and a child walks into the room, the "R" rated media content may automatically be paused or stopped. A smart media playlist is generated that takes into consideration the user profiles of both the adult and the child. This smart media play is then provided to the receiver system 108. The smart media playlist will likely contain family oriented recommendations (e.g., a listing directed more towards the child's user profile). Thus, the recommendation module 224 comprises rules by which one user's attributes in their user profile may be weighted over another user's attributes (e.g., child attributes trump those of an adult attributes).

In a further scenario, the adult and child may be watching a particular show. When the adult leaves the room, the indication of a presence change causes the playback of the current show to pause or stop at the receiver system 108. The indication of the presence change is received by the application server 206 and the recommendation module 224 generates a new smart media playlist that contains a listing of media content specific to the child. For example, cartoons that the adult does not want to watch may now be presented in the smart media playlist to the child.

In yet another scenario, two users may be in the room. One user has a user profile that indicates a preference for sports. The second user has a user profile that indicates that they generally dislike sports, but have a preference for poker. Therefore, the combination the two user profile may result in a smart media playlist that includes a recommendation for a poker competition. The above scenarios are presented merely for illustrative purposes and other scenarios in which example embodiments may be used are contemplated. It should be noted that in this example embodiment, the change in media content presented (e.g., change in a television viewing channel) is effected in an automated fashion without active human direction (e.g., using a remote control).

Figure 3A:
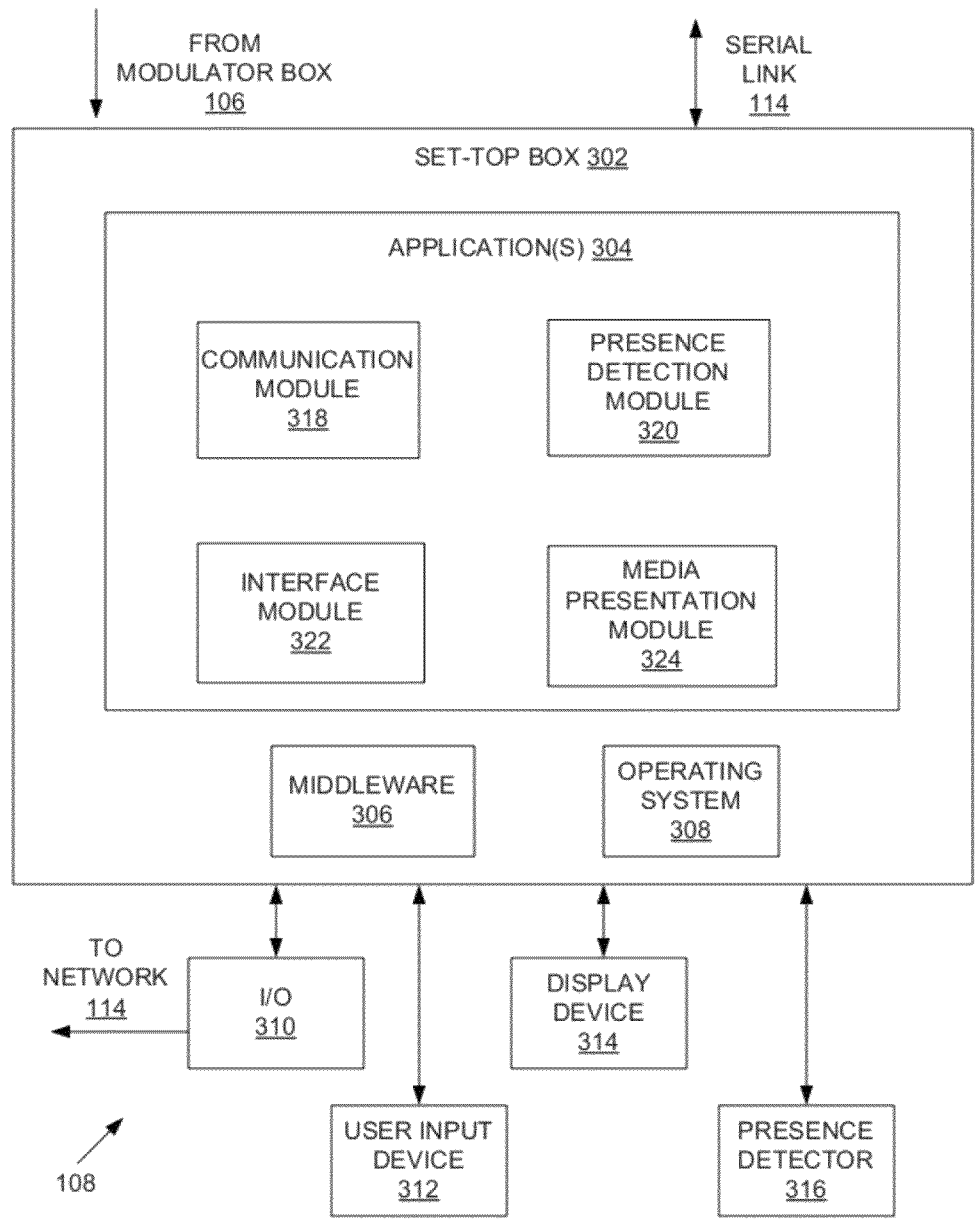
FIG. 3a is a block diagram illustrating an example embodiment the receiving system of the network architecture of FIG. 1.

Referring now to FIG. 3a, the receiver system 108 is shown in more detail. In one example embodiment, the receiver system 108 includes a set-top box (STB) 302 including applications(s) 304, middleware 306, and an operating system 308. The set-top box 302 receives data (e.g., primary and secondary content streams) via the distribution network 104 and the modulator box 106. The set-top box 302 also exchanges data via an input/output device 310 (e.g., modem) for return channel communications with the headend system 202. The receiver system 108 is also shown to include other optional external systems such as a user input device 312 (e.g., a keyboard, remote control, mouse) and a display device 314, coupled to the set-top box 302, for the display of content received at the set-top box 302. In example embodiments, the display device 314 may be a television set, a computer display, or a smart phone display.

The set-top box 302 is also coupled to a presence detector 316. The presence detector 316 detects a presence of one or more viewer users at a location within a vicinity of the set-top box 302 or the display device 314. A viewer user is a user that is known to the set-top box 302 or headend system 202 by way of having a user profile or account associated with the headend system 202 or the set-top-box 302. In example embodiments, the presence detector 316 may comprise one or more of, for example, a facial recognition device, a gesture device, a radio-frequency identification (RFID) device, a camera, a microphone (e.g., to detect a voice of the individual), a biometric device, or any other device capable of detecting a presence of the individual (or information to ascertain the individual's identity) and communicating the detection (e.g., presence information) to the set-top box 302. For example, the RFID device senses an RFID tag of a device being carried by a user. The RFID may be Wi-Fi RFID or hardwired infrared RFID. It is noted that the presence detector 316 may also sense the absence of a user. For example, if one user of a group of users leaves the room, the presence detector 316 will sense the absence and send the presence information (e.g., indication of the presence change) to the application 304. It should be noted that both the user's presence and identity is ascertained by the system.

In another example, a gesture device or a biometric device may be incorporated into the user input device 312 (e.g., a remote control). The gesture device may be a sensor that senses, for example, hand tremors or other user specific movements of the individual. The biometric device may be a sensor that senses other physical traits of the individual such as, for example, heartbeat rate, a fingerprint, or electric conductivity level of the individual. It is noted that an indication of a presence change may also be manually entered into the user input device 312.

The application(s) 304 of the set-top box 302 comprises modules which when executed provide various functionalities to enable delivery and consumption of a smart media playlist and selected media content. To this end, the applications 304 comprise a communication module 318, a presence detection module 320, an interface module 322, and a media presentation module 324 communicatively coupled together. For simplicity, components not directed to example embodiments are not included for the sake of clarity.

The communication module 318 exchanges communications with other components of the receiver system 108 as well as with external components such as with components at the source system 102. For example, the communication module 318 may transmit presence information received from the presence detector 316 to the application server 206 for analysis. Additionally, the communication module 318 receives data from the source system 102 for generating a smart media playlist in response to the transmission of the presence information.

The presence detection module 320 manages presence information at the set-top box 302. In example embodiments, the presence detection module 320 receives the presence information from the presence detector 316 and provides the presence information to the communication module 318 for transmission. The receipt of the presence information (e.g., indication that a new user has entered the room or previously present user has left the room), may cause the presence detection module 320 to trigger the media presentation module 324 to pause or stop playback of the current media content.

In one embodiment, the presence detection module 320 may perform the user identifying process (e.g., incorporate the functionalities of the user identity module 220 of the source system 102). For example, the presence detection module 320 may take the presence information and compare the presence information to corresponding stored data of local users (e.g., users within a home environment in which the set-top box is located). If the user cannot be identified at the local level (e.g., a guest), then the presence information may be sent to the application server 206 for processing.

In an alternative embodiment, some of the components of the presence detector 316 may work together to provide an identification of the user. For example, a camera may capture an image of the individual. Subsequently, the facial recognition device takes the captured image and identifies the specific user. In this case, the application server 206 of the headend system 202 and the presence detection module 320 do not need to perform the identity analysis.

The interface module 322 provides graphical user interfaces (GUI) for the set-top box 302. In example embodiments, the interface module 322 renders and presents the smart media playlist to the display device 314 based on the data received by the communication module 318 from the source system 102. In example embodiments, the smart media playlist is displayed as a visual hierarchical list whereby images of categories are first presented to the user (e.g., television, movies, DVRs). Upon the user selecting one of the categories, images of subcategories within the selected category may be displayed to the user, and so forth. The user may scroll through the images to find the category, subcategories, and media content that the user desires to consume.

The user may then select a media content to consume from the smart media playlist. In response to the selection, the media presentation module 324 obtains the selected media content and delivers the selected media content to the display device 314.

Figure 3B:
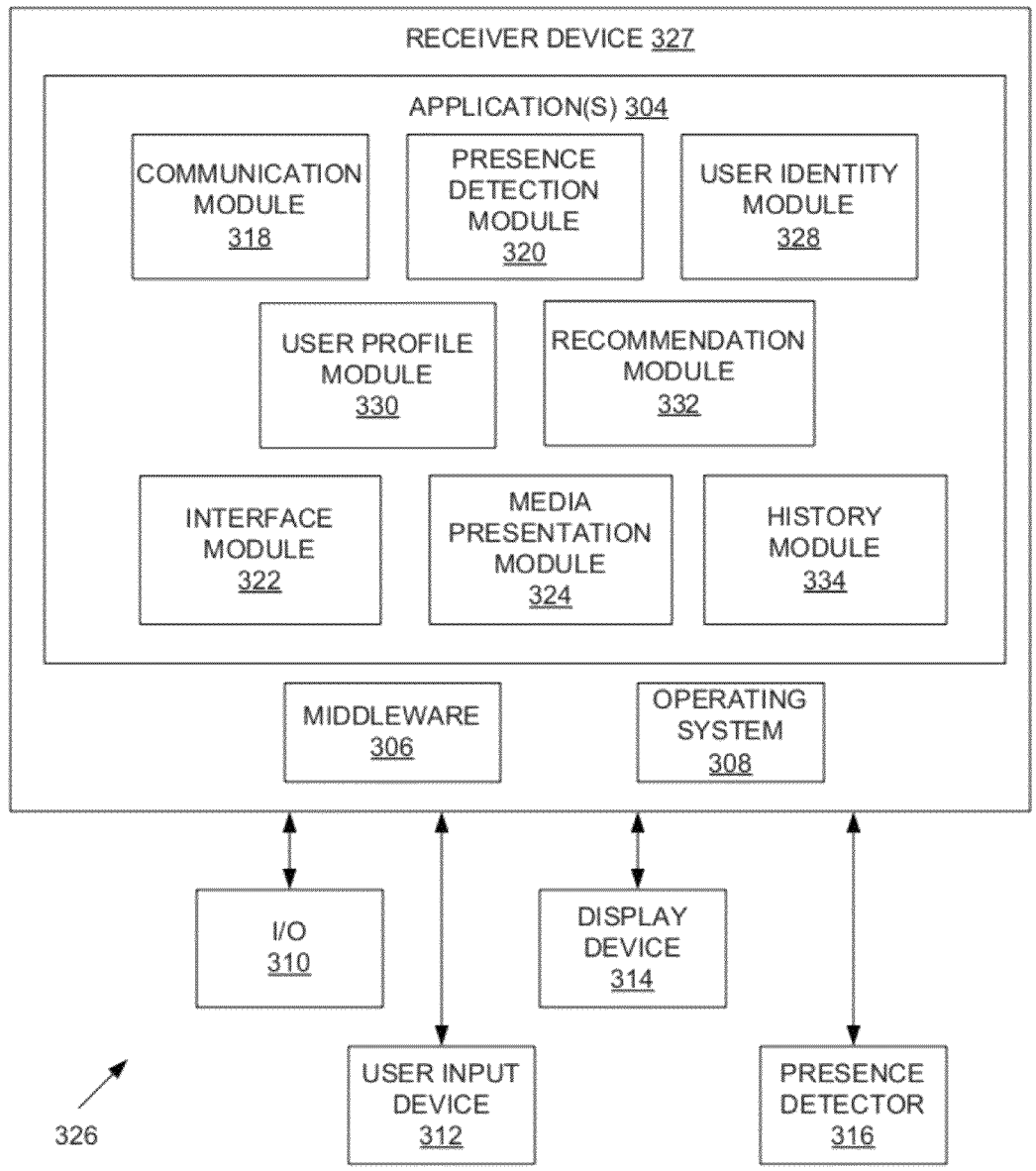
FIG. 3b is a block diagram illustrating a further example embodiment the receiving system of the network architecture of FIG. 1 including user profile information.

While the receiver system 108 is illustrated having a set-top box 120 as a media delivery system, it is noted that the receiving system 108 may comprise a mobile device, a personal computer, or any other device coupled to a network for receiving media content and capable of presenting the media content to a user. In these embodiments and embodiments whereby the identifying of the user(s) or recommendations are performed at the receiver system 108, some of the components of the application 304 may be embodied within these client devices. FIG. 3b illustrates one embodiment of this client device 326 having a receiver device 327 (e.g., set-top box, component of a mobile device).

The same reference numbered components of the embodiment of FIG. 3b function similarly to those of FIG. 3a. However, the embodiment of FIG. 3b further includes a user identity module 328, a user profile module 330, a recommendation module 332, and a history module 334.

The user identity module 220 determines an identity of a user based on the presence information. The user identity module 328 then performs analysis on the presence information to identify the user triggering the presence change (e.g., user entering or leaving the location). In example embodiments, the presence information may be one or more of an image of the user (e.g., facial recognition), a fingerprint, a gesture of the user, or an audio recording of the user. In some cases, the presence information may be obtained from a radio-frequency identification (RFID) tag or other device identifier carried by the user (e.g., a cellular phone, a card). The user identity module 328 may take the presence information and compares the presence information to corresponding stored data in a database coupled to the application 304.

The user profile module 330 accesses user profile information from a coupled database of user profiles (e.g., stored at the set-top box 302). In some embodiments, the user profile module 222 may also forward login information to the source system 102 (via the communication module 318). The profile information comprises user preferences for various attributes associated with available media content (e.g., genre, rating type, actors, language, etc.). For example, a user profile established for a child (e.g., by a parent) may indicate that the child is allowed to view children's programming with a rating of "G." In another example, a user profile may indicate that the user prefers to watch romantic comedies and action films, but does not like to watch sporting events.

Taking the user profile information of the identified one or more users present at the location, the recommendation module 332 generates a smart media playlist (or media content recommendation), which triggers a change in the media content currently being displayed to the users. The smart media playlist may comprise one or more media content selections which the recommendation module 332 determines may be of interest to the user(s) that are present at the location. In cases where more than one user (or viewer) is present, the recommendation module 332 may take the user profile information and perform an analysis to determine a smart media playlist that incorporates the preferences and requirements of each user profile. In an example embodiment, various different rules for selecting or recommending media content are provided that process user profile information.

In some example embodiments, the recommendation module 332 accesses the source system 102 for information in order to perform the recommendation processing at the receiver system 108. For example, the recommendation module 332 may also take into consideration media content that is currently being broadcast (e.g., from a network broadcaster). In these example embodiments, the recommendation module 332 accesses a media content guide of currently broadcasting media content from the source system 102 and performs the selection processing against the media content guide to determine a smart media playlist.

The recommendation module 332 may also work in connection with the history module 334 to remove media content selections that may already have been consumed (e.g., viewed) by one of the users. The history module 334 maintains a list of media content that the user has previously consumed or a list of media content that the user has stored for later viewing.

Figure 4:
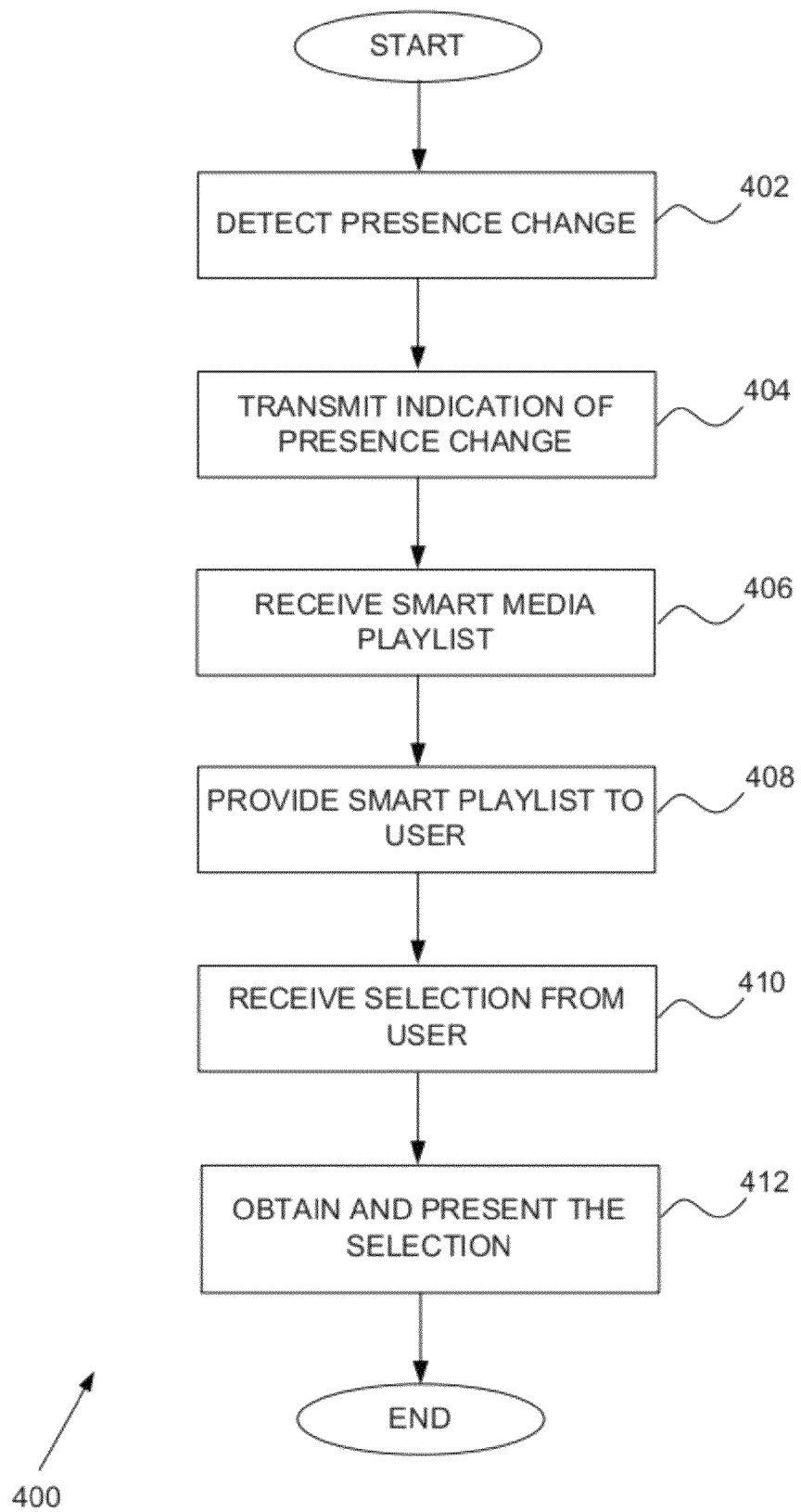
FIG. 4 is a flow diagram of an example method for providing smart media selection based on viewer users presence.

FIG. 4 is a flow diagram of an example method 400 for providing smart media selection at the viewing location (e.g., via the set-top box 302) based on viewer users presence. In operation 402, a presence change is detected at the viewing location. In example embodiment, the presence detector 316 sense presence or absence of a user and sends presence information to the presence detection module 320. The presence detection module 320 may trigger the media presentation module 324 to pause or stop a current playback upon receipt of the presence information.

The indication of presence change is then sent to the source system 102 in operation 404 by the communication module 318. In some embodiments, the indication of presence change that is transmitted is presence information triggered from the presence detector 316. In an embodiment where the identity analysis is performed as the set-top box 302 or at the presence detector 316, user identity information may be sent in operation 404.

The set-top box 302 then receives data directed to a smart media playlist in operation 406 from the source system 102. The smart media playlist comprises a customized list of recommended media content based on the user preferences indicated in the user profiles of the one or more users present (as indicated based on the presence information) at a location of the set-top box 302. In embodiments where the set-top box performs the recommendation analysis, operations 404 and 406 may be replaced with an operation to determine the smart media playlist (e.g., similar to operation 510 of FIG. 5).

The smart media playlist is provided to the user in operation 408. In example embodiments, the interface module 322 provides a GUI that presents the smart media playlist to the user(s) based on the smart media selection data received by the communication module 318 from the source system 102.

The user may then select media content from the smart media playlist to consume. The selection is received in operation 410. For example, the user may scroll through the list of the smart media playlist using the user input device 312 (e.g., remote control). The user may then select media content from the list and indicate using the user input device 312 the selection. The selection is then received by the interface module 322.

In operation 412, the selected media content is obtained and presented to the user. In example embodiments, the media presentation module 324 receives the selection from the user. The media presentation module 324 then requests the selected media content from the source system 102, retrieves the selected media content, and delivers the selected media content to the display device 314.

Figure 5:
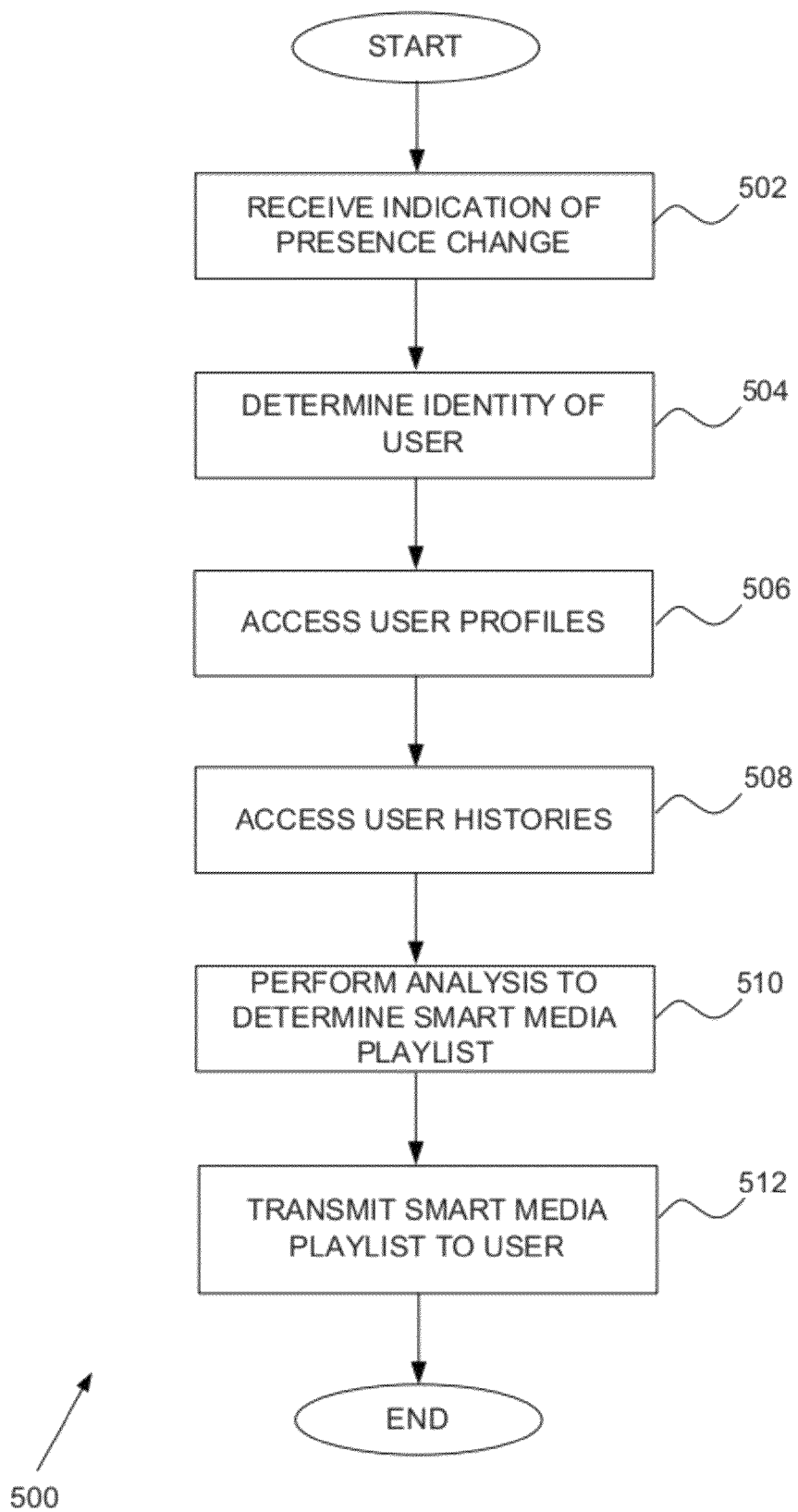
FIG. 5 is a flow diagram of an example method for determining a smart playlist based on viewer users presence.

FIG. 5 is a flow diagram of an example method 500 for determining a smart playlist based on viewer user(s) present at the source system 102. In operation 502, the indication of change in presence is received from the receiver system 108. The change in presence may be one or more users entering or leaving a location (e.g., in vicinity of the set-top box 302 or the display device 314).

In embodiments where the indication comprises presence information, an identity of the user is determined in operation 504. In example embodiments, the user identity module 220 determines an identity of the user by taking the presence information and comparing the presence information to corresponding stored data in a database coupled to the application server 206. In an alternative embodiment, the determination of the identity may occur at the receiver system. In these alternative embodiments, the identities of the one or more users in the room are received in operation 502 and there is no need to perform operation 504.

The user profiles are accessed in operation 506. In example embodiments, the user profile module 222 accesses the user profile information of a set of individuals present in the location of the set-top box 302. Thus, if the presence information is triggered by a user entering the location, the set of individuals include at least the user. However, if the presence information is triggered by the user leaving the location, the set of individuals excludes the user and only includes individuals that were previously identified and are still present at the location. The user profile information comprises user preferences for various attributes associated with available media content (e.g., genre, rating type, actors, language). For example, the user may indicate preferences for certain types of media content and exclude other types of media content.

In operation 508, user histories of the individuals present at the location are accessed. In example embodiments, the history module 226 accesses the user histories of the identified user(s). The user histories may be used to remove media content selections that may already have been consumed (e.g., viewed) by the user(s). The user histories may also be used to determine stored or queued up media content for the user(s). In some embodiments, each of the users identified as being present may have a preselected list of media content associated with their account which is included in the user histories.

Taking the user profile information and the user histories of the identified one or more users present at the location, the recommendation module 224 generates a smart media playlist in operation 510. The smart media playlist may comprise one or more media content selections which the recommendation module 224 determines may be a good recommendation for the user(s) that are present. In cases where more than one user is present, the recommendation module 224 takes the user profile information and performs an analysis to determine a smart media playlist that incorporates the preferences and requirements of each user profile. The recommendation module 224 may incorporate the user histories (e.g., remove media content that is consumed by the users and attempt to find matches between the preselected lists of the users). It is noted that in some embodiments, the user histories may be factored in after the analysis of operation 510 to remove previously consumed media content.

The generated smart media playlist is transmitted back to the set-top box 302 of the user in operation 512. Once returned, the user may review the smart media playlist and select one of the media content from the list to consume. It is noted that the user may decide not to select any of the media content on the smart media playlist and search for other media content. It is further noted that some of the operations of the source system 102 may be performed at similar modules at the receiver system 108.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 6:
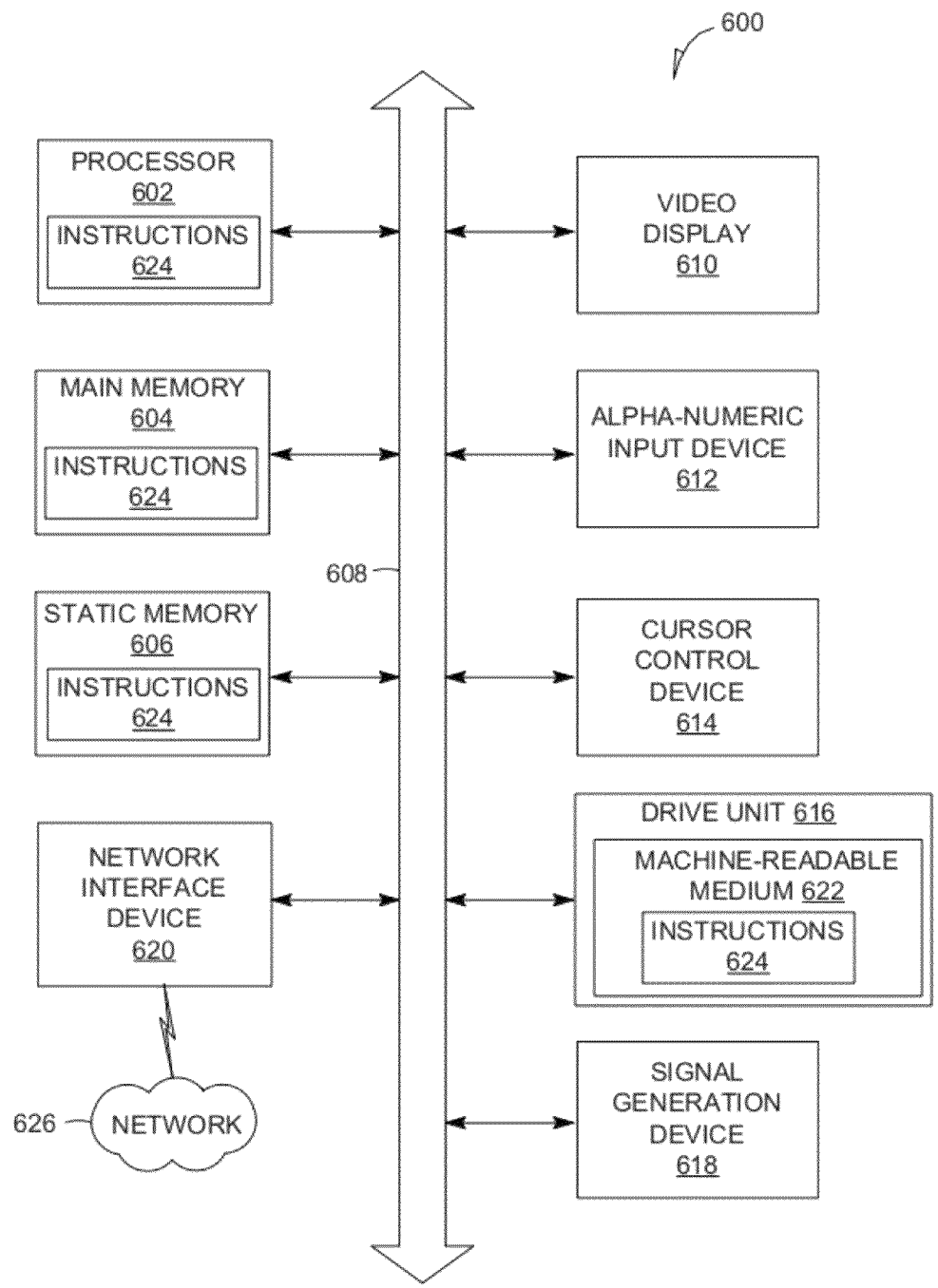
FIG. 6 is a simplified block diagram of a machine in an example form of a computing system within which a set of instructions for causing the machine to perform any one or more of the methodologies discussed herein may be executed.

With reference to FIG. 6, an example embodiment extends to a machine in the example form of a computer system 600 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 may include a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). In example embodiments, the computer system 600 also includes one or more of an alpha-numeric input device 612 (e.g., a keyboard), a user interface (UI) navigation device or cursor control device 614 (e.g., a mouse), a disk drive unit 616, a signal generation device 618 (e.g., a speaker), and a network interface device 620.

Machine-Readable Medium

The disk drive unit 616 includes a machine-readable medium 622 on which is stored one or more sets of instructions 624 and data structures (e.g., software instructions) embodying or used by any one or more of the methodologies or functions described herein. The instructions 624 may also reside, completely or at least partially, within the main memory 604 or within the processor 602 during execution thereof by the computer system 600, with the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of example embodiments, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. In one embodiment, the machine-readable medium comprises a non-transitory machine-readable storage medium.

Transmission Medium

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various example embodiments. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention. As used herein, the term "or" may be construed in either an inclusive or exclusive sense.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense. Further, it will be appreciated that the components/modules described or illustrated in the application may represent logical units and do not necessary correspond to one or more physical devices that may be deployed.

The invention claimed is:

1. A method for customizing displayed media content, the method comprising:

automatically, without human intervention, detecting a change in presence of at least one viewer viewing media content displayed on a display device at a viewing location;

accessing user specific information for each individual remaining at the viewing location, the specific information including a user history for each of the remaining individuals, the user history including a list of previously viewed media content and currently stored media content for each individual, the currently stored media content comprising a preselected list of a plurality of media content that are recorded or queued up for later viewing, the accessing being triggered by the detecting of the change in presence;

generating a single recommendation playlist for the remaining individuals in the viewing location based on commonalities within the user specific information and user history of each of the remaining individuals, the recommendation playlist generated at least by compiling a list of common currently stored media content comprising the preselected list of the plurality of media content that are recorded or queued up for later viewing and removing the previously viewed media content of each of the remaining individuals; and triggering, by one or more processors, a change of the media content displayed based on the user specific information for each of the remaining individuals.

2. The method of claim 1, wherein the change in presence at the viewing location is a departure of the at least one viewer from the viewing location.

3. The method of claim 1, wherein the change in presence at the viewing location is an arrival of the at least one viewer at the viewing location.

4. The method of claim 1, further comprising logging the at least one viewer into or out of a source system based on the detecting of the change in presence.

5. The method of claim 1, wherein the user specific information comprises a user profile for each of the remaining individuals, the user profile indicating preferences and attributes provided by each of the individuals.

6. The method of claim 1, wherein the detecting the change in presence comprising receiving presence information generated by a presence detector.

7. The method of claim 6, further comprising determining an identity of a user associated with the presence information.

8. The method of claim 6, wherein the presence information comprises one or more of an image, a gesture, a radio-frequency identification (RFID) tag, a voice recording, and a biometric indicator.

9. The method of claim 1, wherein the triggering of the change of the media content comprises presenting the recommendation playlist for display on the display device.

10. The method of claim 9, further comprising:

receiving a selection of a media content from the recommendation playlist; and providing the selected media content to the display device.

11. The method of claim 1, wherein the triggering of the change of the media content comprises pausing or stopping current playback of a media content.

12. A system to customize displayed media content, the system comprising:
- a processor of a machine;
- a presence detection module configured to automatically, without human intervention, detect a change in presence of at least one viewer viewing media content displayed on a display device at a viewing location;
- a user profile module configured to access user specific information for each individual remaining at the viewing location, the specific information including a user history for each of the remaining individuals, the user history including a list of previously viewed media content and currently stored media content for each individual, the currently stored media content comprising a preselected list of a plurality of media content that are recorded or queued up for later viewing, the accessing being triggered by the detecting of the change in presence;
- a recommendation module configured to generate a single recommendation playlist for the remaining individuals in the viewing location based on commonalities within the user specific information and user history of each of the remaining individuals, the recommendation playlist generated at least by compiling a list of common currently stored media content comprising the preselected list of the plurality media content that are recorded or queued up for later viewing and removing the previously viewed media content of each of the remaining individuals; and
- a media presentation module to trigger, implemented by the processor of the machine, a change of the media content displayed based on the user specific information for each of the remaining individuals.

13. The system of claim 12, further comprising a user identity module configured to determine an identity of the at least one viewer associated with the detected change in presence.

14. The system of claim 12, further comprising a history module configured to maintain the user history for each of the remaining individuals.

15. The system of claim 12, wherein the user specific information comprises a user profile for each of the remaining individuals, the user profile indicating preferences and attributes provided by each of the individuals.

16. The system of claim 12, further comprising a presence detector configured to generate presence information to be sent to the presence detection module.

17. A machine-readable storage medium having no transitory signals and storing instructions which, when executed by the at least one processor of a machine, cause the machine to perform an operations comprising:
- automatically, without human intervention, detecting a change in presence of at least one viewer viewing media content displayed on a display device at a viewing location;
- accessing user specific information for each individual remaining at the viewing location, the specific information including a user history for each of the remaining individuals, the user history including a list of previously viewed media content and currently stored media content for each individual, the currently stored media content comprising a preselected list of a plurality of media content that are recorded or queued up for later viewing, the accessing being triggered by the detecting of the change in presence;
- generating a single recommendation playlist for the remaining individuals in the viewing location based on commonalities within the user specific information and user history of each of the remaining individuals, the recommendation playlist generated at least by compiling a list of common currently stored media content comprising the preselected list of the plurality of media content that are recorded or queued up for later viewing and removing the previously viewed media content of each of the remaining individuals; and
- triggering a change of the media content displayed based on the user specific information for each of the remaining individuals.

* * * * *

UNITED STATES PATENT AND TRADEMARK OFFICE
CERTIFICATE OF CORRECTION

PATENT NO.        : 8,949,871 B2
APPLICATION NO.   : 12/877875
DATED             : February 3, 2015
INVENTOR(S)       : Chai et al.

It is certified that error appears in the above-identified patent and that said Letters Patent is hereby corrected as shown below:

Title Page

On page 4, in column 1, item (56) under "Other Publications", line 23, delete "Mutimedia" and insert --Multimedia--, therefor In the Claims In column 16, line 2-30, in Claim 1, delete "1. A method for customizing displayed media content, the method comprising:
automatically, without human intervention, detecting a change in presence of at least one viewer viewing media content displayed on a display device at a viewing location;
accessing user specific information for each individual remaining at the viewing location, the specific information including a user history for each of the remaining individuals, the user history including a list of previously viewed media content and currently stored media content for each individual, the currently stored media content comprising a preselected list of a plurality of media content that are recorded or queued up for later viewing, the accessing being triggered by the detecting of the change in presence;
generating a single recommendation playlist for the remaining individuals in the viewing location based on commonalities within the user specific information and user history of each of the remaining individuals, the recommendation playlist generated at least by compiling a list of common currently stored media content comprising the preselected list of the plurality of media content that are recorded or queued up for later viewing and removing the previously viewed media content of each of the remaining individuals; and triggering, by one or more processors, a change of the media content displayed based on the user specific information for each of the remaining individuals." and insert --1. A method for customizing displayed media content, the method comprising:
automatically, without human intervention, detecting a change in presence of at least one viewer viewing media content displayed on a display device at a viewing location;

Signed and Sealed this
Twenty-fifth Day of August, 2015

Michelle K. Lee
*Director of the United States Patent and Trademark Office*

CERTIFICATE OF CORRECTION (continued)
U.S. Pat. No. 8,949,871 B2 accessing user specific information for each individual viewer remaining at the viewing location, the user specific information including a user history for each of the remaining individual viewers, the user history including a list of previously viewed media content and a list of currently stored media content for the each individual viewer, the list of currently stored media content comprising a preselected list of a plurality of media content that are recorded or queued up for later viewing, the accessing being triggered by the detecting of the change in presence of the at least one viewer at the viewing location;

generating a single recommendation playlist for the remaining individual viewers in the viewing location based on commonalities within the user specific information and the user history of the each of the remaining individual viewers, the recommendation playlist generated at least by compiling a list of common media content from the list of the currently stored media content comprising the preselected list of the plurality of media content that are recorded or queued up for later viewing of the remaining individual viewers, and removing from the compiled list of common media content the previously viewed media content of the each of the remaining individual viewers; and triggering, by one or more processors, a change of the media content displayed based on the user specific information for the each of the remaining individual viewers.--, therefor In column 16, line 31, in Claim 2, after "presence", insert --of the at least one viewer--, therefor In column 16, line 34, in Claim 3, after "presence", insert --of the at least one viewer--, therefor In column 16, line 39, in Claim 4, after "presence.", insert --of the at least one viewer.--, therefor In column 16, line 42, in Claim 5, delete "individuals," and insert --individual viewers,--, therefor In column 16, line 43, in Claim 5, delete "individuals." and insert --individual viewers.--, therefor In column 16, line 45, in Claim 6, after "presence", insert --of the at least one viewer--, therefor In column 16, line 48, in Claim 7, delete "a user" and insert --the viewer--, therefor In column 16, line 58, in Claim 10, delete "a" and insert --the--, therefor In column 16, line 63, in Claim 11, delete "a" and insert --the--, therefor In column 17, line 1-33, in Claim 12, delete "12. A system to customize displayed media content, the system comprising:
a processor of a machine;
a presence detection module configured to automatically, without human intervention, detect a change in presence of at least one viewer viewing media content displayed on a display device at a viewing location;
a user profile module configured to access user specific information for each individual remaining at the viewing location, the specific information including a user history for each of the remaining individuals, the user history including a list of previously viewed media content

CERTIFICATE OF CORRECTION (continued)
U.S. Pat. No. 8,949,871 B2 and currently stored media content for each individual, the currently stored media content comprising a preselected list of a plurality of media content that are recorded or queued up for later viewing, the accessing being triggered by the detecting of the change in presence;
a recommendation module configured to generate a single recommendation playlist for the remaining individuals in the viewing location based on commonalities within the user specific information and user history of each of the remaining individuals, the recommendation playlist generated at least by compiling a list of common currently stored media content comprising the preselected list of the plurality media content that are recorded or queued up for later viewing and removing the previously viewed media content of each of the remaining individuals; and a media presentation module to trigger, implemented by the processor of the machine, a change of the media content displayed based on the user specific information for each of the remaining individuals." and insert --12. A system to customize displayed media content, the system comprising:
a processor of a machine;
a presence detection module configured to automatically, without human intervention, detect a change in presence of at least one viewer viewing media content displayed on a display device at a viewing location;
a user profile module configured to access user specific information for each individual viewer remaining at the viewing location, the user specific information including a user history for each of the remaining individual viewers, the user history including a list of previously viewed media content and a list of currently stored media content for each individual viewer, the list of the currently stored media content comprising a preselected list of a plurality of media content that are recorded or queued up for later viewing, the accessing being triggered by the detecting of the change in presence of the at least one viewer at the viewing location;
a recommendation module configured to generate a single recommendation playlist for the remaining individual viewers in the viewing location based on commonalities within the user specific information and the user history of the each of the remaining individual viewers, the recommendation playlist generated at least by compiling a list of common media content from the list of the currently stored media content comprising the preselected list of the plurality of media content that are recorded or queued up for later viewing of the remaining individual viewers, and removing from the compiled list of common media content the previously viewed media content of the each of the remaining individual viewers; and
a media presentation module to trigger, implemented by the processor of the machine, a change of the media content displayed based on the user specific information for the each of the remaining individual viewers.--, therefor In column 17, line 36-37, in Claim 13, after "presence.", insert --of the at least one viewer.--, therefor In column 17, line 40, in Claim 14, delete "individuals." and insert --individual viewers.--, therefor In column 18, line 3, in Claim 15, delete "individuals," and insert --individual viewers,--, therefor In column 18, line 4, in Claim 15, delete "individuals." and insert --individual viewers.--, therefor

CERTIFICATE OF CORRECTION (continued)
U.S. Pat. No. 8,949,871 B2

In column 18, line 8-38, in Claim 17, delete "17. A machine-readable storage medium having no transitory signals and storing instructions which, when executed by the at least one processor of a machine, cause the machine to perform an operations comprising: automatically, without human intervention, detecting a change in presence of at least one viewer viewing media content displayed on a display device at a viewing location; accessing user specific information for each individual remaining at the viewing location, the specific information including a user history for each of the remaining individuals, the user history including a list of previously viewed media content and currently stored media content for each individual, the currently stored media content comprising a preselected list of a plurality of media content that are recorded or queued up for later viewing, the accessing being triggered by the detecting of the change in presence; generating a single recommendation playlist for the remaining individuals in the viewing location based on commonalities within the user specific information and user history of each of the remaining individuals, the recommendation playlist generated at least by compiling a list of common currently stored media content comprising the preselected list of the plurality of media content that are recorded or queued up for later viewing and removing the previously viewed media content of each of the remaining individuals; and triggering a change of the media content displayed based on the user specific information for each of the remaining individuals." and insert --17. A machine-readable storage medium having no transitory signals and storing instructions which, when executed by the at least one processor of a machine, cause the machine to perform operations comprising: automatically, without human intervention, detecting a change in presence of at least one viewer viewing media content displayed on a display device at a viewing location; accessing user specific information for each individual viewer remaining at the viewing location, the user specific information including a user history for each of the remaining individual viewers, the user history including a list of previously viewed media content and a list of currently stored media content for the each individual viewer, the list of currently stored media content comprising a preselected list of a plurality of media content that are recorded or queued up for later viewing, the accessing being triggered by the detecting of the change in presence of the at least one viewer at the viewing location; generating a single recommendation playlist for the remaining individual viewers in the viewing location based on commonalities within the user specific information and the user history of the each of the remaining individual viewers, the recommendation playlist generated at least by compiling a list of common media content from the list of the currently stored media content comprising the preselected list of the plurality of media content that are recorded or queued up for later viewing of the remaining individual viewers, and removing from the compiled list of common media content the previously viewed media content of the each of the remaining individual viewers; and triggering a change of the media content displayed based on the user specific information for the each of the remaining individual viewers.--, therefor